United States Patent [19]

Huber

[11] Patent Number: 4,831,616
[45] Date of Patent: May 16, 1989

[54] MULTIPLEXED FIBER OPTICS WIDEBAND DATA DISTRIBUTION SYSTEM

[76] Inventor: David R. Huber, 7708 Barnstable Pl., Rockville, Md. 20855

[21] Appl. No.: 32,246

[22] Filed: Mar. 31, 1987

[51] Int. Cl.⁴ .............................................. H04B 9/00
[52] U.S. Cl. ...................................... 370/3; 455/608; 455/612; 455/607; 370/4; 370/60
[58] Field of Search ................. 370/4, 3, 60; 455/608, 455/612, 606, 607, 617

[56] References Cited

U.S. PATENT DOCUMENTS

| | | | |
|---|---|---|---|
| 2,579,070 | 2/1945 | Hansell | 250/9 |
| 3,755,676 | 8/1973 | Kinsel | 250/199 |
| 3,838,412 | 9/1974 | Jones et al. | 340/334 |
| 4,450,554 | 5/1984 | Steensma et al. | 370/4 |
| 4,603,416 | 7/1986 | Servel et al. | 370/60 |
| 4,611,323 | 9/1986 | Hessenmuller | 370/79 |
| 4,612,636 | 9/1986 | Grover et al. | 370/94 |
| 4,621,282 | 11/1986 | Ahern | 370/4 |
| 4,630,258 | 12/1986 | McMillen et al. | 370/60 |

FOREIGN PATENT DOCUMENTS

| | | | |
|---|---|---|---|
| 1190675 | 7/1985 | Canada | 370/4 |
| 8503184 | 7/1985 | PCT Int'l Appl. | 370/4 |

Primary Examiner—Robert L. Griffin
Assistant Examiner—L. Van Beek
Attorney, Agent, or Firm—Kerkam, Stowell, Kondracki & Clarke

[57] ABSTRACT

A system for distributing wideband video information from a plurality of input sources to a plurality of users in which the input signals are converted into groups of packets of digital words, each packet corresponding to a video frame of information and each group comprising packets from a corresponding group of the input signals. The groups of packets are modulated onto optical signals which are multiplexed onto a single fiber optics line for transmission to the users. At the users, the signals are demultiplexed, demodulated, and input to a time domain routing switch which provides a predetermined number of output lines to each user. A control unit associated with each user issues control signals to the switch so as to route selected input signals to specified output lines to enable the user to access selectively and randomly any of the input signals.

11 Claims, 3 Drawing Sheets

MULTIPLEXED FIBER OPTICS WIDEBAND DATA DISTRIBUTION SYSTEM

BACKGROUND OF THE INVENTION

This invention relates generally to the distribution of wideband information or data carrying signals to a plurality of users, and more particularly to the distribution of a large number of video signals economically and in a cost-effective manner so as to enable each user to access selectively and randomly any one or more of the video signals and to display the information carried thereon.

There exist situations in which wideband data or information from a large number of different sources must be made available simultaneously to a plurality of users such that each user can access selectively and randomly any of the various information sources as needed. One example of such a situation is in the financial community where brokers or traders on the trading floor of a stock or options exchange have the requirement of accessing selectively and randomly information or data from a large number of different sources. Typically, each trader has a desk or console containing a number of video displays on which information may be displayed. Information is supplied to the exchange via leased lines and the like from a large number of different commercial information sources, such as wire or other information services, and is generally supplied in the form of wideband formatted video signals which are capable of being directly displayed on a video display. There may be, for example, 120 or more different input wideband video signals to the exchange, each of which may have a bandwidth of the order of 15 MHz, and each of which must be simultaneously available to several hundred traders. The need to give each trader access to any of the input signals has, in the past, necessitated rather cumbersome, complicated and expensive analog data distribution systems comprising long runs of large bundles of coaxial cables and rather bulky and complicated switching systems. Because of the rather wide bandwidths of the input signals, it has not been feasible to use computers for storing and distributing the information, nor to use conventional multiplexed data distribution techniques.

It is desirable to provide a system for distributing wideband information from a large number of such input sources which avoids the foregoing and other disadvantages of known systems by enabling the information to be distributed more simply, more efficiently, and more cost-effectively, and it is to this end that the present invention is directed.

SUMMARY OF THE INVENTION

The invention provides a simplified system for distributing efficiently and cost-effectively a large number of information-carrying wideband input signals, such as video signals, to a plurality of users in such a manner that each user may selectively and randomly access any one or more of the signals, as desired, and display the information content of the selected signals. The invention does not require either long runs of bulky bundles of coaxial cables or complicated analog switching systems for distributing the information-carrying signals. Accordingly, a system in accordance with the invention is less expensive and more convenient than known systems of the type to which the invention pertains. Furthermore, the system is capable of handling many different types of input signals and is readily expandable in terms of both the number of input signals as well as the number of end users which the system can accommodate, and it has a number of other advantages over known similar types of systems.

The significant advantages afforded by the invention over other known data distribution systems are due, in large part, to the use of optical techniques for multiplexing packets of data or information from each of a large number of input information-carrying signals and for distributing the packets over a single fiber optics line to a plurality of users. At the users, the signals are optically demultiplexed and combined in the time domain in such a way as to enable each individual user to access selectively any one or more of the signals and to display the information content of the accesses signals.

Briefly states, a system in accordance with the invention for distributing information from a plurality of input sources to a plurality of users which accomplishes the foregoing objectives and has other advantages over other known systems which perform similar functions may comprise switching means for sampling the plurality of input signals; means for forming groups of packets of digital words, each packet comprising a video frame of information from one of the input sources and each group being constituted by packets formed from predetermined ones of the input signals; optical generator means for producing a corresponding optical signal for each group of packets, each optical signal being modulated by the packets of its corresponding group; means for multiplexing the modulated optical signals onto an optical transmission line for transmission to the users; means coupled to the transmission line for demultiplexing the optical signals; means for demodulating the optical signals and for providing electrical signals corresponding to the packets; time domain switching means for routing the electrical signals to the users and providing to each user a predetermined number of output lines; and control means associated with each user for controlling the time domain switching means to route selected signals to the output lines so as to enable the user to access selectively and randomly any of the input signals.

More specifically, each of the input signals may be an analog video signal which is converted to digital form, and a group of digital words corresponding to a video frame of information is assembled into a packet. The packets, along with the packets corresponding to a particular subset, i.e., group, of input signals modulates an optical transmitter, the output of which is spatially multiplexed onto a single fiber optics line along with the outputs from other optical transmitters modulated by other groups of input signals. One or more signal splitters may be provided along the fiber optics line to provide drop off points at the locations of groups or clusters of users. At each cluster of users, the optical signals are demultiplexed and supplied to optical receivers which demodulate each of the groups of packet signals and produce corresponding digital electrical signals. The electrical signals are combined in a time division multiplexer into digital data streams in which each packet of information is channeled into a particular time slot. Each user is provided with a predetermined number of output lines form the time division multiplexer corresponding to the number of displays associated with that user. Each user has a keyboard/control unit which selects the particular packets of information which are supplied to each of that users output lines. Each output line supplies the selected packet to a corresponding memory, such as a RAM, and thence to a digital-to-analog converter which converts the packet into analog information for display on an associated display unit.

The optical portion of the system is a convenient, low cost way of distributing large quantities of data. Because of the large bandwidths available at optical frequencies, a number of the high data rate input analog signals may be conveniently grouped together in a single group and employed for modulating a single fiber optics transmitter. Similarly, by forming groups of different subsets of the input signals and modulating other fiber optics transmitters with each group, the number of optical signals impressed upon the fiber optics line may be considerably smaller than the number of analog input signals, thereby enabling conventional optical wave division multipliers to be employed for multiplexing and demultiplexing the signals on the fiber optics line, and the single fiber optics line replaces the large bundles of coaxial cables previously required for distributing the input signals to the plurality of different users.

The invention affords other advantages which will become apparent from the description which follows.

BRIEF DESCRIPTION OF A PREFERRED EMBODIMENT

The present invention is particularly well adapted for use in the financial community, for example, for distributing information or data in the form of a large number of analog wideband video signals to a plurality of users so as to enable each user to access selectively any one or more of the input signal and to display the information carried thereon, and will be described in that context. However, as will become apparent from the description which follows, this is illustrative of only one utility of the invention.

Figure 1:
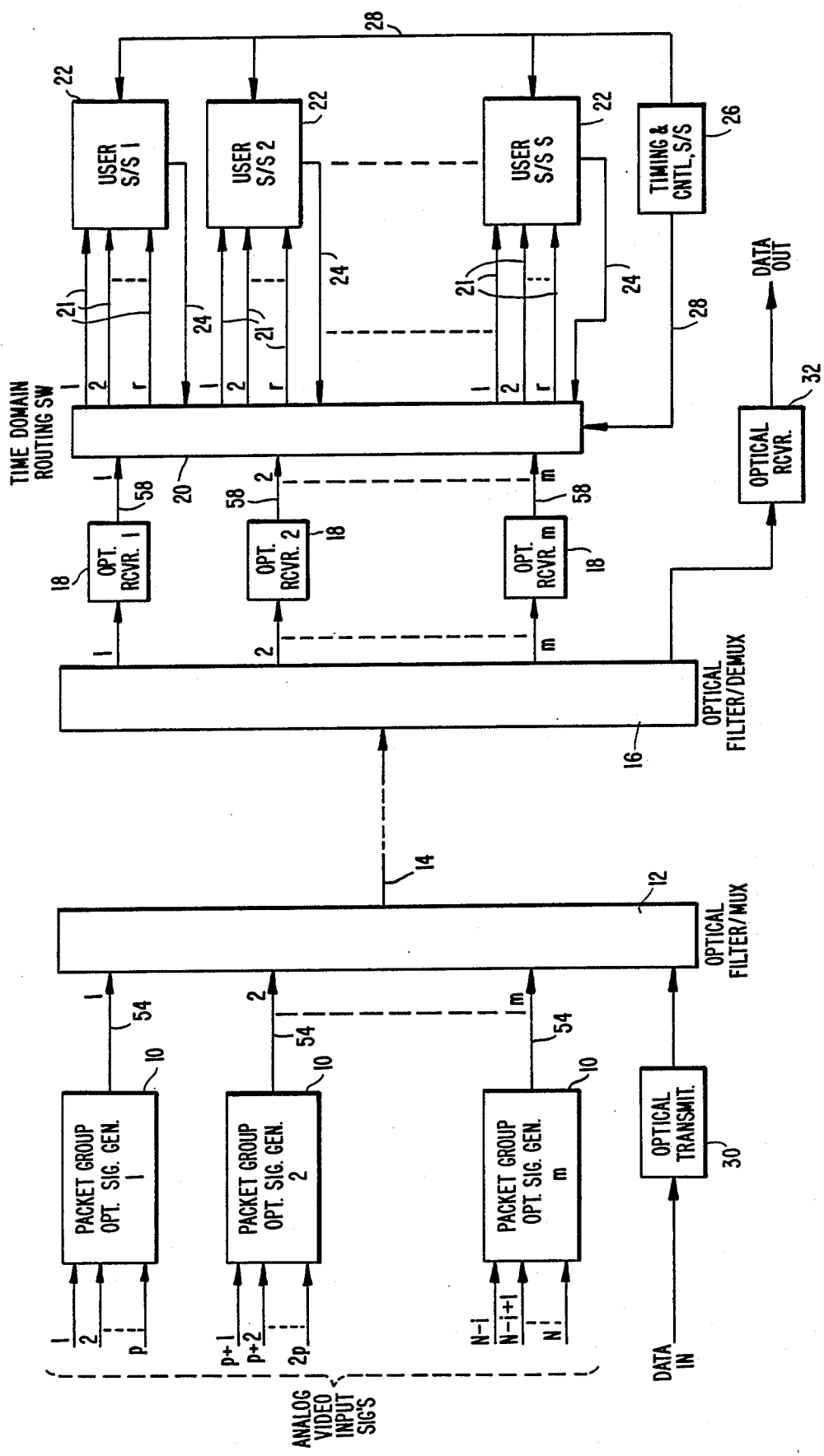
FIG. 1 is a block diagram of a preferred form of a multiplexed fiber optics data distribution system in accordance with the invention.

FIG. 1 is a block diagram of a preferred form of a multiplexed fiber optics data distribution system in accordance with the invention. A number, N, of information carrying wideband analog input signals may be supplied to the system from information sources (not illustrated), as, for example, from wire services such as Reuters or the like. Each analog input signal may comprise a video signal having a standard video format and a video rate of the order of 15 MHz, for example. Such signals present alphanumeric data or information in the form of reasonably high resolution video screens or pictures, and they could be supplied directly to a video monitor to display the information. As shown, the N input signals may be supplied in groups of p signals to a plurality, m, of packet group optical signal generators 10, each of which may be the same. As will be explained in more detail shortly, each packet group optical signal generator 10 samples the p analog input signals of its corresponding group, converts the samples to digital form, assembles the samples into packets corresponding to video frames, and outputs an optical signal modulated by the packets of its group of corresponding input signals. The m modulated optical signals from the optical generators may be supplied to m input channels of an optical filter/multiplexer 12, which multiplexes the modulated optical signals together and impresses the resulting composite optical signal onto an optical transmission line 14, such as a fiber optics line. The fiber optics line transmits the composite optical signal to an optical filter/demultiplexer 16, which demultiplexes the composite signal and provides, on separate output channels, the m modulated optical signals to corresponding optical receivers 18. The optical receivers demodulate the modulated optical signals and provide corresponding electrical output signals to a time domain routing switch 20. The electrical output signals are in digital form and represent the information contained in the groups of packets which modulated their corresponding optical signals. Thus, each electrical signal represents p channels of information corresponding to the samples of the p input signals of its associated group. The time domain switch combines the output electrical signals from the optical receivers in the time domain to provide N channels of information corresponding to the N input signals, and supplies a predetermined number, r, of output lines 21 to each of a plurality, s, of user subsystems 22. As will be described in more detail shortly, each user subsystem may include a keyboard/control unit which supplies switch select control signals via a line 24 to the time domain switch for selectively accessing any r of the N channels via the r output lines to the user subsystem, and may include r display units for displaying the information in the r accessed channels. A timing and control subsystem 26 may supply timing and control signals via lines 28 to the time domain switch and to each of the user subsystems.

An advantage of the digital/optical multiplexing subsystem of FIG. 1 is that is affords a substantial simplification in hardware and cabling over conventional analog switching systems, while enabling each user to access conveniently and selectively any of the N analog input signals. Also, any number of users may simultaneously access and display the same channels of information. In the case of a trading floor installation, each user subsystem may comprise a desk or console at which a trader works. The desk or console may include a number, r, of video display units on which the trader displays desired information, and may include a keyboard/control unit which allows the trader to select the information which is displayed. Typically, a number of user desks may be grouped together in clusters, and there may be several clusters located about the trading floor. In this instance, the optical fiber 14 may be routed around the floor, and drop off points provided at each cluster of desks. This simplifies the cabling, and may be accomplished by employing signal splitters at each drop off point and reproducing at each cluster the right-hand portion of the system of FIG. 1 comprising the demultiplexer, optical receivers, and time domain switch. The number of drop off points is limited only by the available optical power and the desired signal-to-noise ratio at each cluster.

Another advantage of the system of FIG. 1 is that the optical multiplexing/transmission/demultiplexing portion of the system may also be employed directly, without the electronics portions associated with forming packets and time domain switching of the packets of video signals for distributing other types of secondary data or information, as, for example, for providing communications among users. As shown in FIG. 1, the input data may be supplied directly to an optical transmitter 30 to produce a modulated optical signal which is multiplexed by multiplexer 12 onto the fiber optics line 14 for distribution along with packets of the analog input signals. The data, which may be single or multichannel narrow band (in relation to the video input signals) data or voice, may be demultiplexed in demultiplexer 16 and supplied to a optical receiver 32, which demodulates the optical signal and provides a corresponding data output. As may be appreciated, the system of FIG. 1 may be employed for distributing a number of such secondary data signals.

Figure 2:
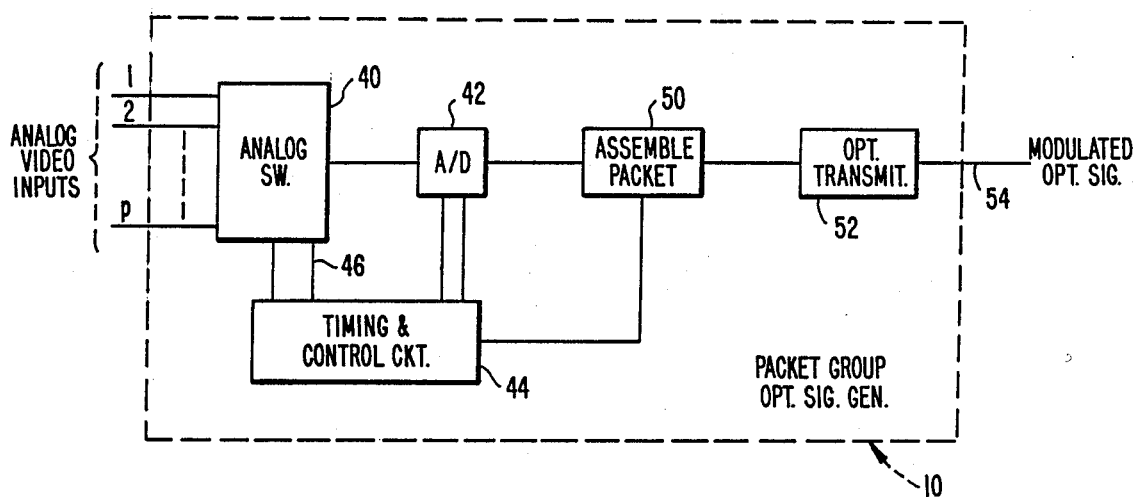
FIG. 2 is a block diagram of a portion of FIG. 1 for generating a packet group optical signal.

Considering the system of FIG. 1 in more detail, there may be, for example, $N=128$ or more input analog video signals. The input signals may be separated into six groups of $p=20$ signals and one group of $i=8$ signals. The numbers of signals in each group need not be the same nor need the signals be synchronous. The groups of signals may be supplied to $m=7$ substantially identical packet group optical signal generators 10, each of which provides a corresponding modulated optical signal to the optical filter/multiplexer 12. FIG. 2 illustrates a preferred form of the packet group optical signal generator 10. As shown, generator 10 may comprise a commutating analog switch 40 which receives as inputs the group of p input analog video signals, and provides an output to an analog-to-digital (A/D) converter 42. The analog switch may be controlled by a timing and control circuit 44 so as to step sequentially and cyclically through each of its p inputs to sample the p input signals and supply the sampled signals to the A/D converter. Preferably, the switch is controlled so that it samples each input signal for one complete video frame. As noted earlier, the input signals may be in standard video formats. As each input signal is sampled, the switch may provide the input signal to the timing and control circuit via a line 46, and the timing and control circuit may embody standard commercially available video detector integrated circuits for detecting the video framing signals on the input signal and for providing appropriate timing signals to control the stepping of the analog switch. The A/D converter, which also may be controlled by the timing and control circuit 44, digitizes the sampled video input signal and provides a digital output to a circuit 50 which assembles a packet of digital words corresponding to a complete video frame of the sampled signal. Circuit 50 may also append to each packet of digital words header information, produced, for example, by the timing and control circuit, to identify the particular input signal to which the packet corresponds. Circuit 50 may comprise, for example, a memory, such as a buffer or a RAM, which is convenient if it is desired to retransmit the packet at a different rate, or it may simply comprise gating circuits arranged to append the header information from the timing and control circuit to the packets in real time.

Each packet of digital words output by circuit 50 corresponds to one complete video frame of information, i.e., one still picture. As previously noted, the video rate of the input video signals is typically of the order of 15 MHz, in which case the A/D converter may operate at a sampling rate of the order of 40–45 MHz, or at a higher rate if higher resolution is desired. This input video rate corresponds to a moving picture rate having higher resolution than standard television video, for example, which is convenient for providing reasonably detailed displays of alphanumeric data with good resolution, although the information contained in the input video signals is, in reality, still picture information. Accordingly, in order to derive the information, it is necessary to quantize only a single video frame, which for a standard frame rate of 30 frames per second requires approximately 33 msec. After sampling a particular input signal for one video frame, the timing and control circuit causes the analog switch to step to the next input signal and this signal is then sampled for one frame. This process is repeated with the switch continuously stepping successively through each of its inputs. For 20 input signals, each signal may be resampled to provide updated information approximately every 700 msec. The A/D converter may use any desired number of quantization levels. For alphanumeric data, 2–3 bit quantization is sufficient.

The packets of digital words from circuit 50 may be supplied to a conventional optical transmitter 52, which produces on a line 54 an optical signal that is modulated by the packets corresponding to the group of input video signals to the switch. The optical transmitter may comprise, for example, an optical signal source, such as a laser or a light emitting diode (LED), which is capable of being modulated by the digital output from circuit 50. If a laser is used, the emitted optical wavelength must fall within the optical bandpass of the corresponding input channel of the optical multiplexer 12. If an LED is used, it is required that its output optical signal have sufficient spectral density within the optical bandpass of the multiplexer such that adequate optical power is available at the optical receivers. Suitable commercially available LED's which may be employed are available, for example, from Honeywell, which has a line of LED's which operate at center wavelengths in the range 820–850 nm, have a 3 dB spectral width of the order of 50 nm, and optical power outputs of the order of 60–400 $\mu$W. Other suitable commercially available LED's which operate near 1300 nm or 1500 nm with spectral widths of the order of 80–100 nm and 30–50 $\mu$W of power are available from Lasertron.

The optical filter/multiplexer 12 (FIG. 1) which receives the modulated optical signals from the packet group optical signal generators 10 and outputs a composite multiplexed optical signal to fiber optics line 14 may comprise a conventional wavelength division multiplexer. Wavelength division multiplexers are commercially available with from 2–40 channels in the above wavelength ranges from a number of different manufacturers including PTR Optics Corporation of Waltham, Mass., I.S.A. Jobin Yvon of France, and ITT of Roanoke, Va. Each channel of the wavelength division multiplexer comprises an optical bandpass filter centered at a different wavelength, and, accordingly, passes only a predetermined spectral band of the total optical energy produced by the optical transmitter. Accordingly, the modulated optical signals from the packet group optical signal generators are separated by the wavelength division multiplexer into bands of spectral energy centered at discrete wavelengths. These are combined and impressed spatially upon the fiber optics line 14. Since wavelength division multiplexers are reciprocal devices, the optical filter/demultiplexer 16 (FIG. 1) may be a wavelength division multiplexer which is the same as the optical filter/multiplexer 12.

Optical receivers 18, which demodulate the demultiplexed optical signals from demultiplexer 16, may also be standard commercially available devices. The m optical receivers demodulate the demultiplexed optical signals and produce on lines 58 m corresponding electrical digital signals which represent the information contained in the m groups of packets which modulated the optical signals. The digital signals from the optical receivers comprise serial digital data signals.

Figure 3:
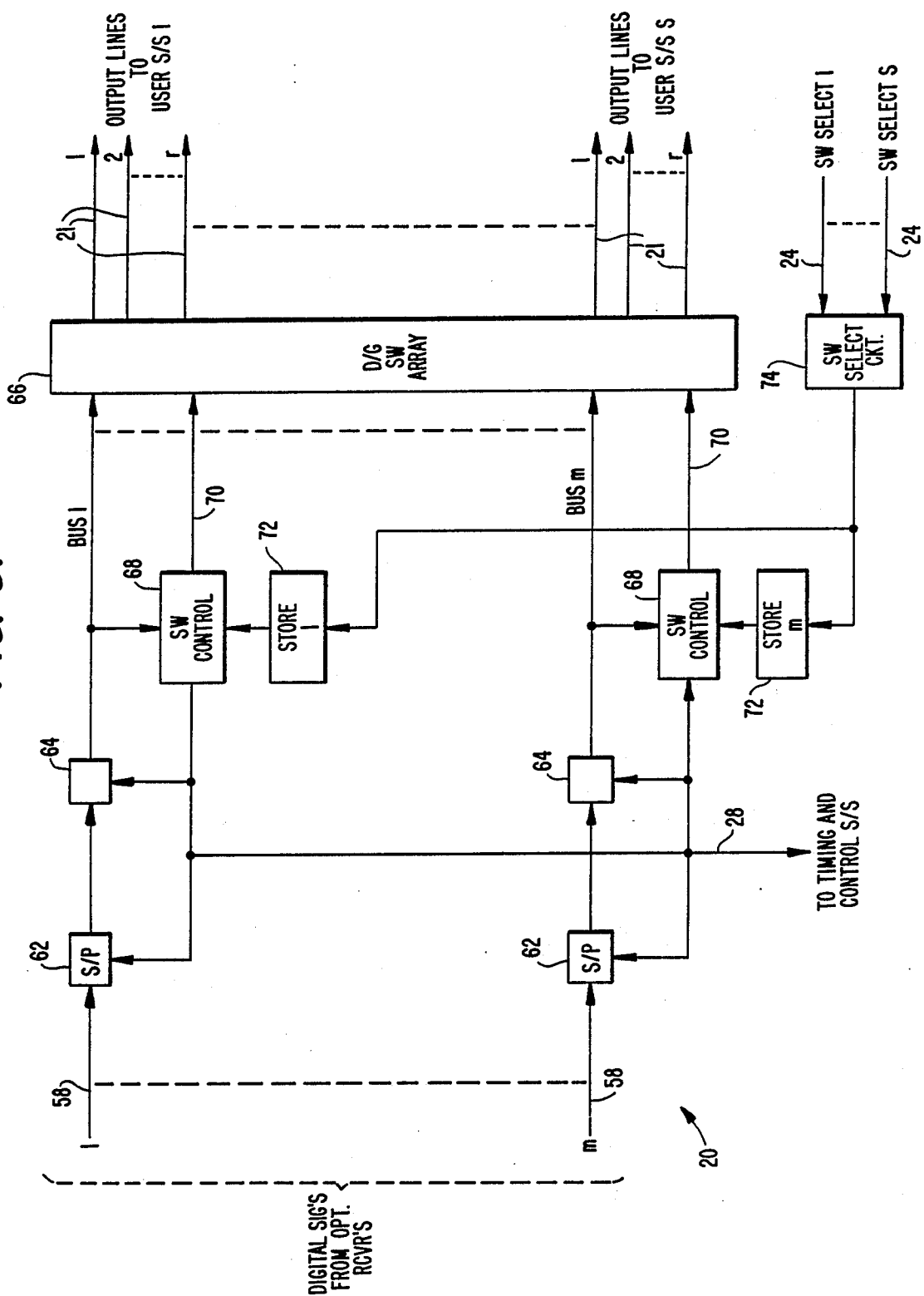
FIG. 3 is a block diagram of a time domain routing switch which may be employed with the invention.

As noted above, the time domain routing switch receives the digital signals from the optical receivers and routes packets of data corresponding to selected input video signals to the user subsystems. FIG. 3 is a block diagram of a time domain routing switch 20 which may be employed for this purpose. As shown, each of the serial digital input signals on lines 58 from the optical receivers may be first converted to a lower speed parallel data stream by a serial-to-parallel (S/P) converter 62. Each of the parallel data streams may then be applied to a circuit 64 which impresses the data stream onto a corresponding data bus as a time division multiplexed signal comprising p packets of digital data, where p corresponds to the number of input video signals of the group. Thus, bus 1 which receives digital input 1 from optical receiver 1 contains time division multiplexed packets of data corresponding to the first group, e.g., input video signals 1–20; bus 2 contains time division multiplexed packets of data corresponding to the second group, e.g., input video signals 21–40, etc. Thus, each packet of data is stored within a predetermined time slot of a TDM frame. The data buses from circuit 64 may be connected as inputs to a digital switching array 66, comprising standard logic gates, which provides r output lines to each of the s user subsystems 22. Each bus may also be connected to a switch control circuit 68 which supplies control signals via a control line 70 to the digital switching array, and which receives inputs from a corresponding store 72. The stores 72 may be connected to the output of a switch select circuit 74, which receives a inputs switch select signals via lines 24 from each of the user subsystems. The switch select signals from the user subsystems provide the time domain switch 20 the address or identity of the input video signal selected by each user, identify the user, and specify the particular output lines to the user to which the packets corresponding to the selected input video signals are to be routed. This information may be stored in stores 72 and supplied to the switch control circuits 68. The switch control circuits may monitor the address or identity information contained in the header of each data packet, compare the header information with the address or identity information stored in stores 72, and provide control signals via lines 70 to the digital switching array during appropriate portions of the TDM frame to gate the selected packets to the specified output lines. The selected data packets may be gated to the specified output lines during each TDM frame, thereby providing updated information to the users.

Figure 4:
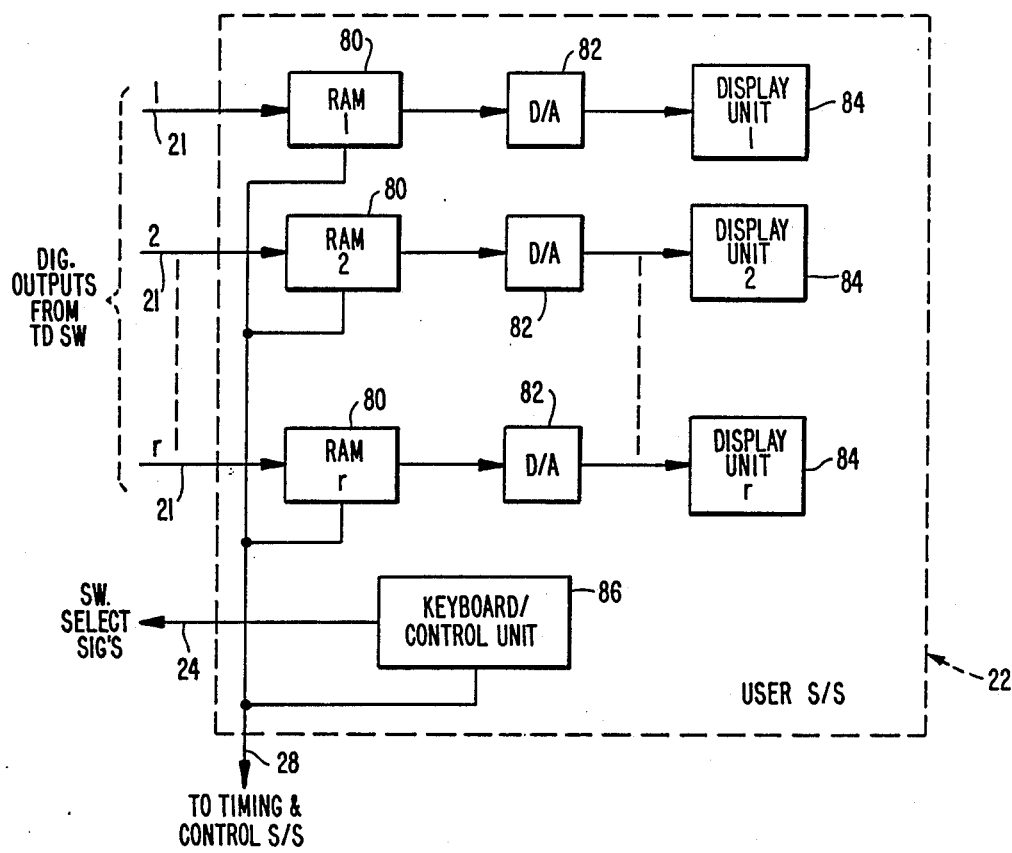
FIG. 4 is a block diagram of a typical user configuration which may be employed with the invention.

FIG. 4 illustrates a preferred form of a user subsystem 22. Each of the user subsystems may be the same. As shown, each of the r output lines from the time domain switch to a user subsystem 22 may be supplied to a corresponding RAM 80. The RAM is preferably sized to hold a block of data at least corresponding to one packet, i.e., one video frame. The output of the RAM may be supplied to a digital-to-analog (D/A) converter 82, which converts the digital data from the RAM back into analog video form and supplies it to a corresponding display unit 84 which displays the information to the user. The selection of the data supplied to each of the lines of the user subsystem may be accomplished by a keyboard/control unit 86. As noted above, the keyboard/control unit may supply the switch select signals via line 24 to the time domain switch for opening gates connected to each of the input lines to the user subsystem at appropriate times during the TDM frames so that the data within selected TDM channels is output from the switch. The packets of information in the selected channels are stored in the RAM's of the user subsystem, and then converted to analog form by the D/A converter 82 and displayed.

Data may be continuously read into the switch from optical receivers 18 so that the data in the N channels of the TDM frames is updated by new sample data. Also, the data stored in each of the RAM's 80 of the user subsystems may be updated on each assigned TDM frame, allowing the information that is displayed on the display units to be updated at a desired rate.

While a preferred embodiment of the invention has been shown and described, it will be appreciated by those skilled in the art that changes may be made in this embodiment without departing from the principles and spirit of the invention, the scope of which is defined in the appended claims.

I claim:

1. A system for distributing information to a plurality of users from information sources which supply the information as a plurality of information-carrying input video signals, comprising means for sampling the plurality of input signals; means responsive to the sampling means for forming groups of packets of digital words, each packet comprising a video frame of information from a corresponding one of the input signals and each group comprising packets being formed from a corresponding group of input signals; optical transmitter means for producing optical signals modulated by each group of packets; means for multiplexing the modulated optical signals on an optical transmission line for transmission of the optical signals to said users; means for demultiplexing the modulated optical signals; means for demodulating the demultiplexed modulated optical signals and for producing electrical signals corresponding to the packets; time domain switching means for routing the electrical signals to said user, the time domain switching means providing a predetermined number of output lines to each user; and control means associated with each user for controlling the time domain switching means to route selected ones of the electrical signals to the output lines of such user so as to enable the user to access selectively and randomly any of said input signals.

2. The system of claim 1, wherein said input signals comprise wideband high resolution video signals.

3. The system of claim 2, wherein said sampling means comprises an analog switch for each of said groups of input signals, each analog switch having inputs for receiving the input signals of its corresponding group and having an output, and a timing and control circuit for controlling the analog switch so as to connect the output of the switch cyclically to each of the switch inputs for a period of time corresponding to one complete video frame of the input signal connected to such output.

4. A system for distributing information to a plurality of users from information sources which supply the information as a plurality of information-carrying wideband high resolution input video signals, comprising means for sampling the plurality of input signals; means responsive to the sampling means for forming groups of packets of digital words, each packet comprising a video frame of information from a corresponding one of the input signals and each group comprising packets being formed from a corresponding group of input signals; optical transmitter means for producing optical signals modulated by each group of packets; means for multiplexing the modulated optical signals on an optical transmission line for transmission of the optical signals to said users; means for demultiplexing the modulated optical signals; means for demodulating the demultiplexed modulated optical signals and for producing electrical signals corresponding to the packets; time domain switching means for routing the electrical signals to said users, the time domain switching means providing a predetermined number of output lines to each user; and control means associated with each user for controlling the time domain switching means to route selected ones of the electrical signals to the output lines of such user so as to enable the user to access selectively and randomly any of said input signals, wherein said sampling means comprises an analog switch for each of said groups of input signals, each analog switch having inputs for receiving the input signals of its corresponding group and having an output, and a timing and control circuit for controlling the analog switch, the timing and control circuit comprising means responsive to the input signals for detecting the video frames of such input signals and for stepping the analog switch after each frame so as to connect the output of the switch cyclically to each of the switch inputs for a period of time corresponding to one complete video frame of the input signal connected to such output.

5. A system for distributing information to a plurality of users from information sources which supply the information as a plurality of information-carrying input video signals, comprising means for sampling the plurality of input signals; means responsive to the sampling means for forming groups of packets of digital words, each packet comprising a video frame of information from a corresponding one of the input signals and each group comprising packets being formed from a corresponding group of input signals; optical transmitter means for producing optical signals modulated by each group of packets; means for multiplexing the modulated optical signals on an optical transmission line for transmission of the optical signals to said users; means for demultiplexing the modulated optical signals; means for demodulating the demultiplexed modulated optical signals and for producing electrical signals corresponding to the packets; time domain switching means for routing the electrical signals to said users, the time domain switching means providing a predetermined number of output lines to each user; and control means associated with each user for controlling the time domain switching means to route selected ones of the electrical signals to the output lines of such user so as to enable the user to access selectively and randomly any of said input signals, wherein the packet group forming means comprises an analog-to-digital converter for converting the input signals into corresponding digital signals, and means for assembling the digital signals which correspond to one video frame into one packet, the assembling means including means for including in such packet a header identifying the input signal to which such packet corresponds.

6. The system of claim 5, wherein said optical transmitter means comprises an optical transmitter for each of said group of packets, and means for modulating the optical transmitter with the digital signals of its corresponding group of packets to form a modulated optical signal for each group of input signals.

7. The system of claim 6, wherein said multiplexing means comprises a first wavelength division multiplexer for multiplexing the modulated optical signals onto the optical transmission line at different optical wavelengths, and said demultiplexing means comprises a second wavelength division multiplexer located at a cluster of said users for demultiplexing the modulated optical signals and for supplying the demultiplexed optical signals to the demodulating means.

8. The system of claim 7 further comprising a memory connected to the output liens, the memories each being sized to store a packet of digital signals corresponding to one video frame, a digital-to-analog converter connected to each memory for converting the digital signals into analog signals, and a display unit connected to the digital-to-analog converter for displaying the analog signals.

9. THe system of claim 7, wherein the packet switching means comprises a data bus for each group of digital signals, means for time division multiplexing the digital signals onto the data buses, means for storing signals from the control means of each user identifying the user, the input signals selected by the user, and the output lines specified by the user to which the packets corresponding to the selected input signals are to be routed, and means for comparing the header of each packet with the stored signals and for routing packets corresponding to selected input signals to the specified output lines.

10. The system of claim 5, wherein said electrical signals comprise packets of digital signals, and the time domain switching means comprises means responsive to the control means for a user for switching a packet of digital signals corresponding to a selected input signal to a specified one of the output lines of such user.

11. The system of claim 10, wherein each user has a display unit associated with each of the output lines to such user, and said control means associated with each user comprises means for indicating to the time domain switching means each input signal selected by the user and the output line of the user to which the packet corresponding to the selected input signal is to be routed.

* * * * *